US010443709B2

(12) United States Patent
Kelly

(10) Patent No.: US 10,443,709 B2
(45) Date of Patent: Oct. 15, 2019

(54) DIAL SHIFTER

(71) Applicant: Honda Motor Co., Ltd., Tokyo (JP)

(72) Inventor: Shawn P. Kelly, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 15/712,309

(22) Filed: Sep. 22, 2017

(65) Prior Publication Data

US 2019/0093758 A1 Mar. 28, 2019

(51) Int. Cl.
*F16H 59/08* (2006.01)
*F16H 61/24* (2006.01)
*F16H 63/42* (2006.01)
*F16H 59/02* (2006.01)

(52) U.S. Cl.
CPC ............. *F16H 59/08* (2013.01); *F16H 61/24* (2013.01); *F16H 63/42* (2013.01); *B60Y 2400/3012* (2013.01); *F16H 2059/0221* (2013.01); *F16H 2059/081* (2013.01); *F16H 2061/247* (2013.01); *F16H 2063/423* (2013.01)

(58) Field of Classification Search
CPC .......... F16H 59/08; F16H 61/24; F16H 63/42; F16H 2059/0221; F16H 2059/081; F16H 2061/247; F16H 2063/423; B60Y 2400/3012
See application file for complete search history.

(56) References Cited

U.S. PATENT DOCUMENTS

| 3,590,612 | A | * | 7/1971 | Henning | B60K 37/06 200/293.1 |
|---|---|---|---|---|---|
| 4,630,499 | A | | 12/1986 | Hopkins | |
| 5,884,528 | A | | 3/1999 | Ludanek et al. | |
| 6,196,078 | B1 | | 3/2001 | DeJonge et al. | |
| 6,295,887 | B1 | * | 10/2001 | DeJonge | B60K 37/06 477/99 |
| 7,460,029 | B2 | | 12/2008 | Boorman et al. | |
| 7,971,498 | B2 | * | 7/2011 | Meyer | B60K 37/06 200/19.18 |
| 8,226,527 | B2 | | 7/2012 | Unno | |
| 9,021,913 | B2 | | 5/2015 | Kamoshida et al. | |
| 9,334,949 | B2 | * | 5/2016 | Fett | F16H 59/08 |
| 9,410,614 | B2 | * | 8/2016 | Muraki | F16H 59/08 |
| 9,845,868 | B2 | * | 12/2017 | Lee | F16H 59/08 |
| 2015/0369357 | A1 | * | 12/2015 | Lee | F16H 59/08 74/504 |
| 2016/0312882 | A1 | * | 10/2016 | Heo | F16H 59/08 |
| 2017/0175884 | A1 | * | 6/2017 | Watanabe | F16H 59/08 |
| 2018/0038478 | A1 | * | 2/2018 | Arakawa | B60K 20/02 |
| 2018/0087657 | A1 | * | 3/2018 | Fujii | F16H 59/08 |

\* cited by examiner

*Primary Examiner* — Tinh T Dang
(74) *Attorney, Agent, or Firm* — Honda Patents & Technologies North America, LLC; Mark E. Duell

(57) ABSTRACT

A shifter mechanism for a transmission of a motor vehicle controlled by a transmission controller includes a central processing unit for transmitting a shifting request to the transmission controller, a dial shifter including a rotatable shifter knob and a rotation mechanism in communication with the rotatable shifter knob and about which the rotatable shifter knob rotates, and a sensor connected to the central processing unit for detecting rotation of the rotatable shifter knob.

20 Claims, 8 Drawing Sheets

DIAL SHIFTER

TECHNICAL FIELD

The embodiments disclosed herein are related to shifting mechanisms for a transmission of a vehicle, and more specifically to dial shifters for shifting a transmission of a vehicle.

BACKGROUND

The shift device for the transmission of a motor vehicle is provided with a shift lever which is typically located in the center console. When there is no center console, or when the center console does not provide a space for installing the shift lever, the shift lever may also be provided adjacent to the steering column or on the instrument panel.

In a typical automatic transmission, the shift positions are arranged in the order of the P (parking) position, the R (reverse) position, the N (neutral) position and the D (drive) in that other. Oftentimes, a special forward travel position is provided in addition to the D (drive) position, and is typically located next to the drive position on the other side of the N position. Such an additional forward travel position is called as the S (sport mode) position, the 2 (second) position and the L (low speed) position depending on the purpose thereof. In the case of an electric vehicle or a hybrid vehicle, the additional forward travel position may consist of the B (regenerative braking) position. As the special forward travel position is designed for a special purpose such as increasing the engine brake and improving the response of the vehicle, it is selected only under special circumstances. As the additional forward travel position is located next to the D position, it is possible that the vehicle operator inadvertently selects the additional forward travel position, and it may irritate the vehicle operator.

Therefore, there is established a need to provide for an improved shifter device that maximizes the space in the passenger compartment of the motor vehicle that provides all of the required functionality regarding shifting, including a special shift operation from the D (drive) position to the additional forward travel position.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a shifter mechanism for a transmission of a motor vehicle controlled by a transmission controller includes a central processing unit for transmitting a shifting request to the transmission controller, a dial shifter including a rotatable shifter knob and a rotation mechanism in communication with the rotatable shifter knob and about which the rotatable shifter knob rotates, and a sensor connected to the central processing unit for detecting rotation of the rotatable shifter knob.

According to another aspect, a shifter mechanism for a transmission of a motor vehicle, the transmission controlled by a transmission controller including a dial shifter that can be manually advanced selectively in a first direction and a second direction, a sensor that detects a movement of the dial shifter, and a central processing unit for instructing the transmission controller to select a shift position of the transmission from a plurality of shift positions in a prescribed order according to a detection signal of the sensor, wherein the central processing unit is configured to cause the selected shift position to be changed in the prescribed order in correspondence to a rotational displacement of the dial shifter in each single shifting operation under normal condition, and to limit the selected shift position to be changed beyond a prescribed shift position depending on an initial shift position and an amount of the rotational movement of the dial shifter in a single shifting operation, and wherein the shift positions include a non-forward travel position, a D (drive) position for a normal forward travel and an additional forward travel position S for a special purpose arranged in that order in the first direction, and the central processing unit is configured to limit the change in the shift position from the non-forward travel position in a single shifting operation in the first direction to the D (drive) position without regard to the rotational displacement of the dial shifter beyond the D (drive) position.

According to yet another aspect, a shifter mechanism for a transmission of a motor vehicle, the transmission controlled by a transmission controller, including a dial shifter that can be manually advanced selectively in a first direction and a second direction. The dial shifter includes a rotatable shifter knob and a rotation mechanism in communication with the rotatable shifter knob and about which the rotatable shifter knob rotates. The shifter mechanism further includes a sensor that detects a movement of the dial shifter and a central processing unit for instructing the transmission controller to select a shift position of the transmission from a plurality of shift positions in a prescribed order according to a detection signal of the sensor. The central processing unit is configured to cause the selected shift position to be changed in the prescribed order in correspondence to a rotational displacement of the dial shifter in each single shifting operation under normal condition, and to limit the selected shift position to be changed beyond a prescribed shift position depending on an initial shift position and an amount of the rotational movement of the dial shifter in a single shifting operation. The shift positions include a non-forward travel position, a D (drive) position for a normal forward travel and a sport mode forward travel position S arranged in that order in the first direction. The central processing unit is configured to limit the change in the shift position from the non-forward travel position in a single shifting operation in the first direction to the D (drive) position without regard to the rotational displacement of the dial shifter beyond the D (drive) position. The transmission may be shifted from the D (drive) position to the sport mode forward travel position S in a second shifting operation in the first direction after the selection of the D (drive) position is completed in a first shifting operation without regard to the rotational displacement of the dial shifter beyond the D (drive) position.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
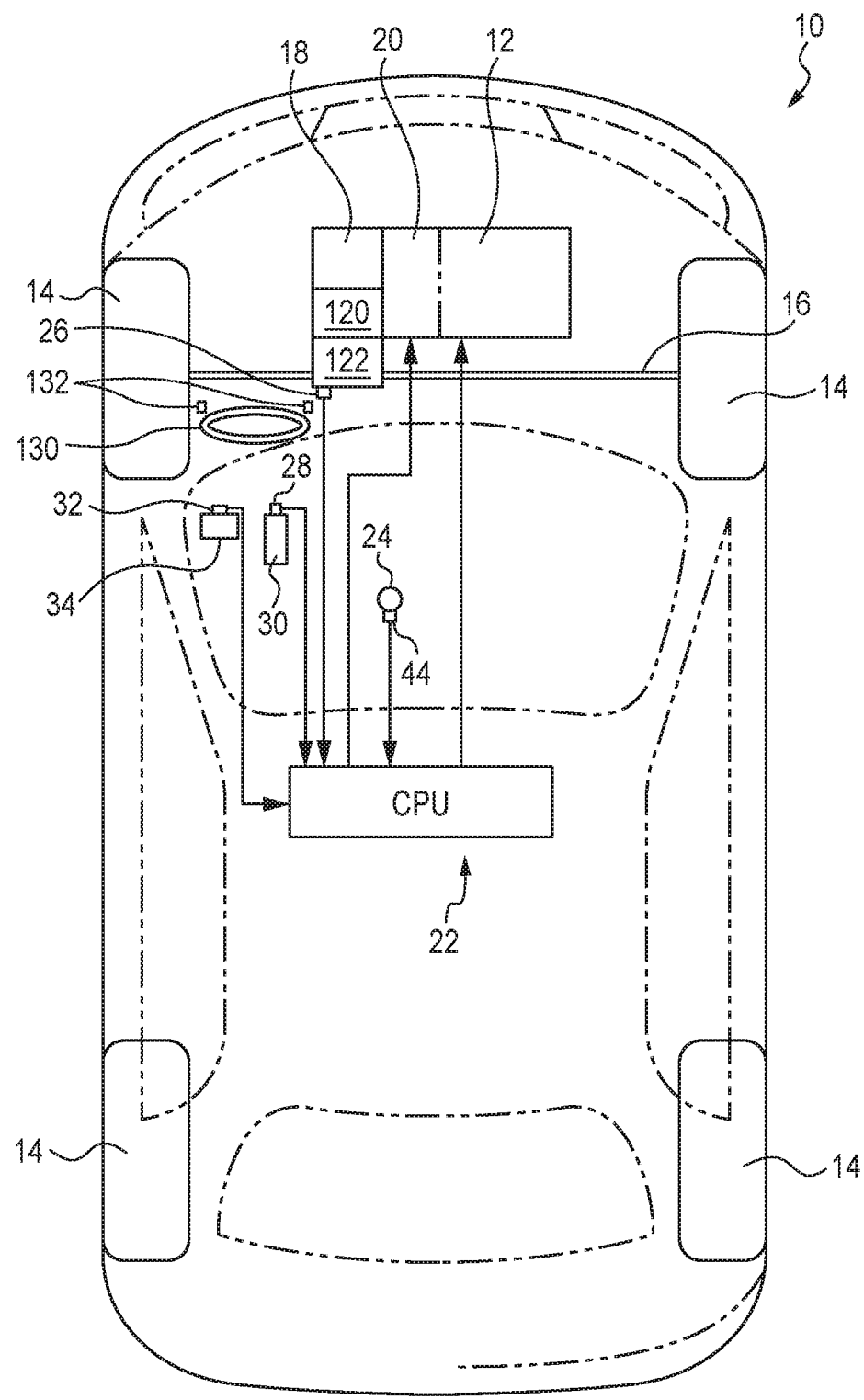
FIG. 1 is an illustration showing an overall functional structure of a motor vehicle.

Referring to FIG. 1, a vehicle 10 is provided with an internal combustion engine 12 as a power source, and the output of the engine 12 is transmitted to wheels 14 via a front axle 16 via an automatic transmission 18. The driven road wheels of the vehicle 10 of the illustrated embodiment consist of front wheels, but embodiments are equally applicable to rear wheel drive vehicles where rear wheels consist of driven road wheels and four wheel drive vehicles where both the front and rear wheels consist of driven road wheels. The automatic transmission 18 of the illustrated embodiment consists of a multi gear stage automatic transmission system having four forward drive stages and one reverse drive stage, but may also consist of a continuously variable transmission (CVT). The motor vehicle may have additional drive stages, and the embodiments illustrated should not be viewed as limiting the concepts addressed herein. The motor vehicle 10 may also be an electric vehicle fitted with an electric motor instead of an internal combustion engine or a hybrid vehicle fitted with an electric motor in combination with the engine 12.

The vehicle 10 may also include a control unit 20 incorporated with the transmission 18, a central processing unit ("CPU") 22 for controlling the control unit 20 with a microcomputer, ROM, RAM, peripheral circuits, input/output interfaces and various drivers, a dial shifter 24 for manually selecting the gear range of the transmission 18, a vehicle speed sensor 26 for detecting the traveling speed of the vehicle 10, an accelerator pedal sensor 28 for detecting the displacement of the accelerator pedal 30 and a brake pedal sensor 32 for detecting the depression of the brake pedal 34 or the engagement of the brake device. The CPU 22 may be integrally formed within the control unit 20, or, as illustrated in FIG. 1, the CPU 22 may be part of a separate computer processing system within the vehicle 10.

The control unit 20 performs a shift control whereby the gear range of the transmission 18 is selected according to the operation of the dial shifter 24 and detection and processing by the CPU 22, and the gears of the transmission 18 are changed according to the selected gear range and the operating condition of the engine 12, in addition to controlling the operation of the engine 12. The shifting of the gears is performed via the control unit 20 by a known method by those skilled in the art, such as shifting solenoid valves provided in a hydraulic circuit of the transmission 18. When the vehicle 10 consists of an electric vehicle or a hybrid vehicle, the control unit 20 may also controls the driving and regenerating action of a motor generator as well.

Figure 2:
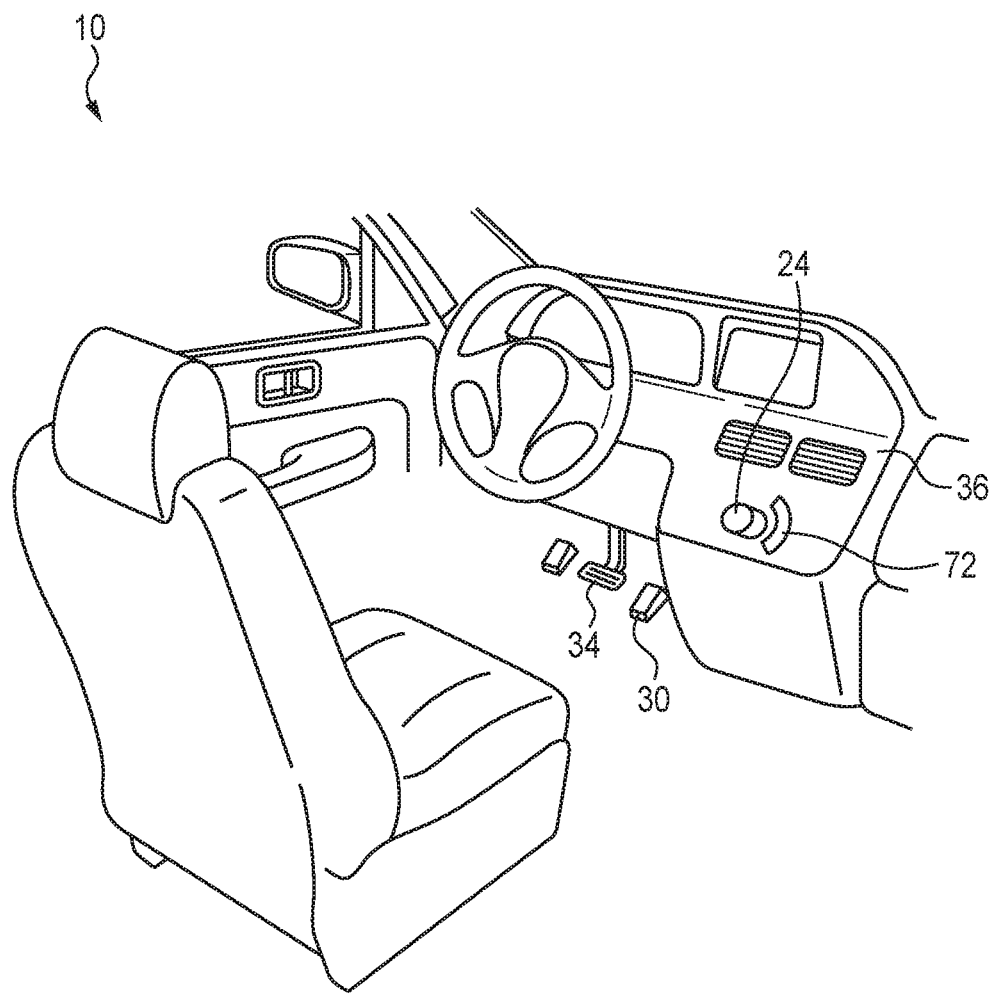
FIG. 2 is a perspective view of a portion of a passenger compartment of the motor vehicle surrounding the vehicle operator's seat.
Figure 3:
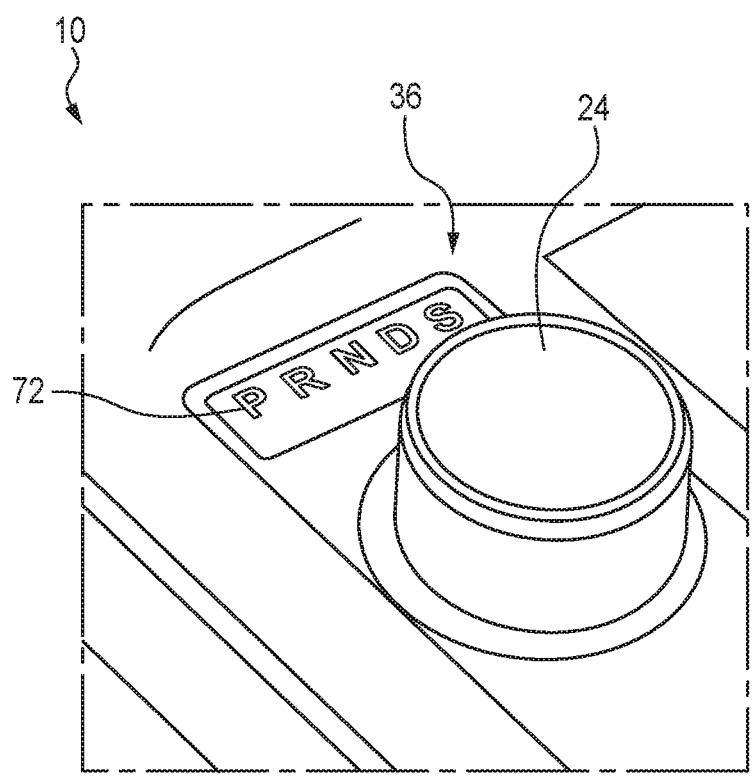
FIG. 3 is a perspective view of a dial shifter in the motor vehicle.

As illustrated in FIGS. 2 and 3, the dial shifter 24 is cylindrically shaped, and is located on a portion of an instrument panel 36 of the vehicle 10. The provision of the dial shifter 24 on the instrument panel 36 provides for the more efficient usage of the inner space of the passenger compartment of the motor vehicle 10. The dial shifter 24 may typically have a diameter of between 50-55 mm, although dial shifters of additional sizes may be employed. The dial shifter 24 may be configured to be rotated in either direction, clockwise or counter-clockwise, and to provide detent action such that the operator of the vehicle 10 is able to sense, through tactile sensation, rotational movement of the dial shifter 24, and to further prevent the dial shifter 24 from rotating without operator input.

Figure 4:
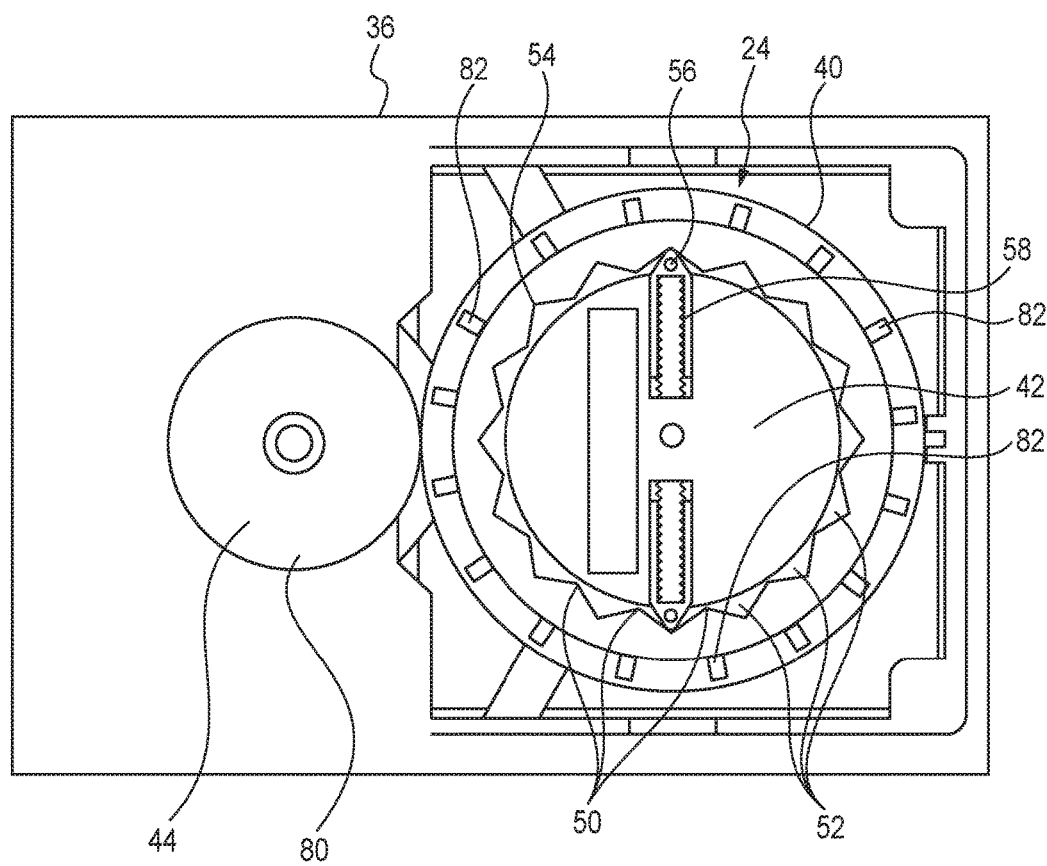
FIG. 4 is top view of cross-section of an embodiment of the dial shifter of FIG. 3.

Specifically, as illustrated in FIG. 4, the dial shifter 24 may include a rotatable shifter knob 40 that is in communication with a rotation mechanism 42 attached to the instrument panel 36 and about which the shifter knob 40 rotates. Additionally, the dial shifter 24 includes a sensor 44 for detecting the position and rotation of the dial shifter 24.

In the embodiment illustrated in FIG. 4, the detent action is provided by a plurality of alternating peaks 50 and detents 52 disposed on an inner circumferential surface 54 of the shifter knob 40. A plunger 56 disposed within the rotation mechanism 42 for engaging the inner circumferential surface 54 of the shifter knob 40 is biased outwardly into contact with the inner circumferential surface 54 of the shifter knob 40 by a spring 58 in communication with the plunger 56 for biasing the plunger 56 in a radially outward direction and into contact with the inner circumferential surface 54 of the shifter knob 40. As the shifter knob 40 is rotated, the plunger 56, which is biased outwardly by the spring 58, travels radially inward and outward of the rotation mechanism 42 as the distal end 60 of the plunger 56 contacts the alternating peaks 50 and detents 52. When the operator of the vehicle 10 is finished rotating the shifter knob 40, the bias of the spring 58 will cause the plunger 56 to come to rest in one of the detents 52.

Figure 5:
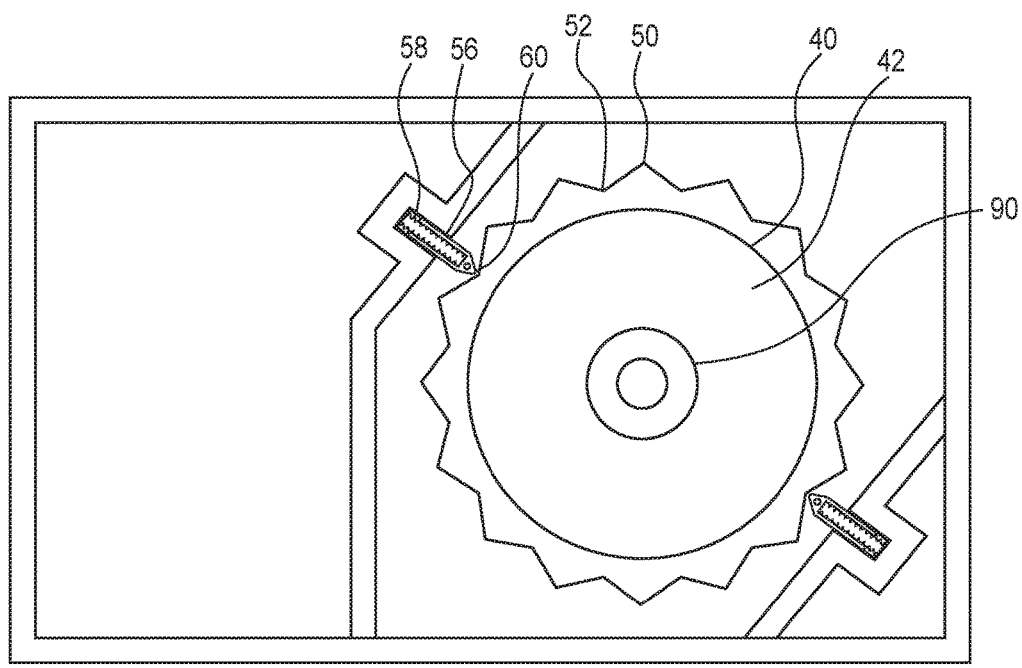
FIG. 5 is top view of cross-section of another embodiment of the dial shifter of FIG. 3.

In an alternate embodiment, illustrated in FIG. 5, the detent action is provided by a plurality of alternating peaks 50 and detents 52 disposed on an outer circumferential surface 62 of the rotation mechanism 42. A plunger 56 disposed within the shifter knob 40 for engaging the outer circumferential surface 62 of the rotation mechanism 42 is biased inwardly into contact with the outer circumferential surface 62 of the rotation mechanism 42 by a spring 58 in communication with the plunger 56 for biasing the plunger 56 in a radially inward direction and into contact with the outer circumferential surface 62 of the rotation mechanism 52. As the shifter knob 40 is rotated, the plunger 56, which is biased inwardly by the spring 58, travels radially outward and inward of the rotation mechanism 42 as the distal end 60 of the plunger 56 contacts the alternating peaks 50 and detents 52. When the operator of the vehicle 10 is finished rotating the shifter knob 40, the bias of the spring 58 will cause the plunger 56 to come to rest in one of the detents 52.

Figure 6:
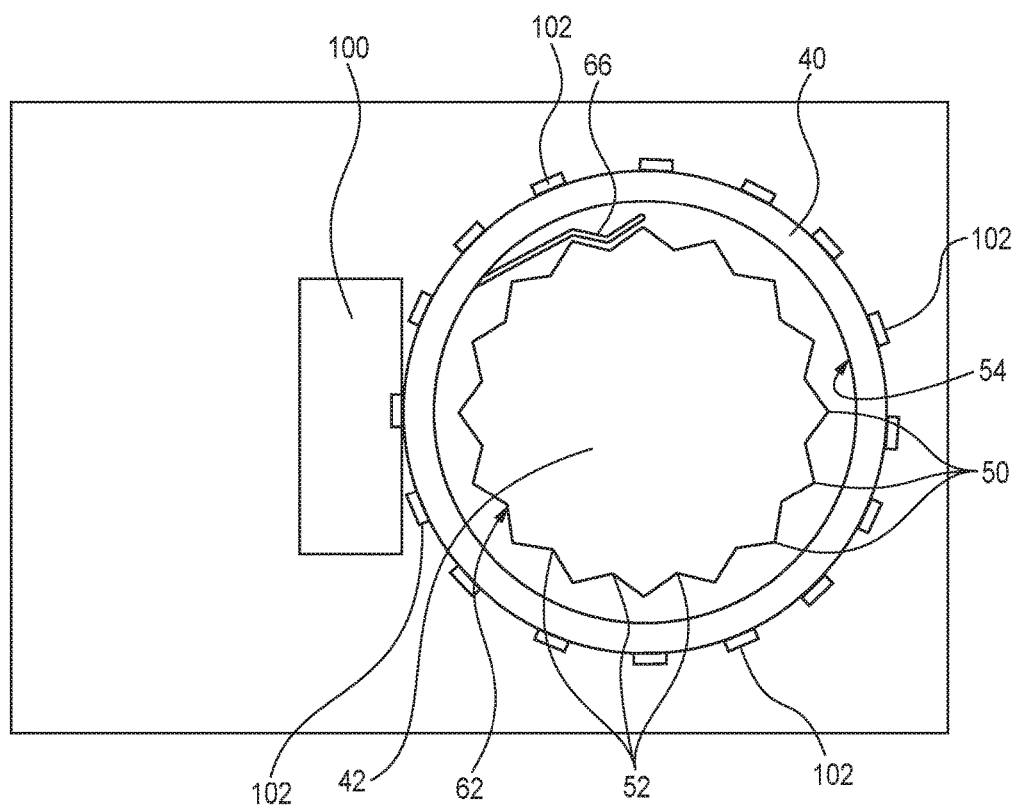
FIG. 6 is top view of cross-section of yet another embodiment of the dial shifter of FIG. 3.

In yet another alternate embodiment, illustrated in FIG. 6, the detent action is provided by a plurality of alternating peaks 50 and detents 52 disposed on an outer circumferential surface 62 of the rotation mechanism 42 and a cantilever spring 66 biased inwardly from an inner circumferential surface 54 of the shifter knob 40 and in contact with the outer circumferential surface 62 of the rotation mechanism 42. The cantilever spring 66 engages the plurality of alternating peaks 50 and detents 52 of the rotation mechanism 42. When the operator of the vehicle 10 is finished rotating the shifter knob 40, the bias of the cantilever spring 66 will force the cantilever spring 66 to come to rest in one of the detents 52.

Figure 7:
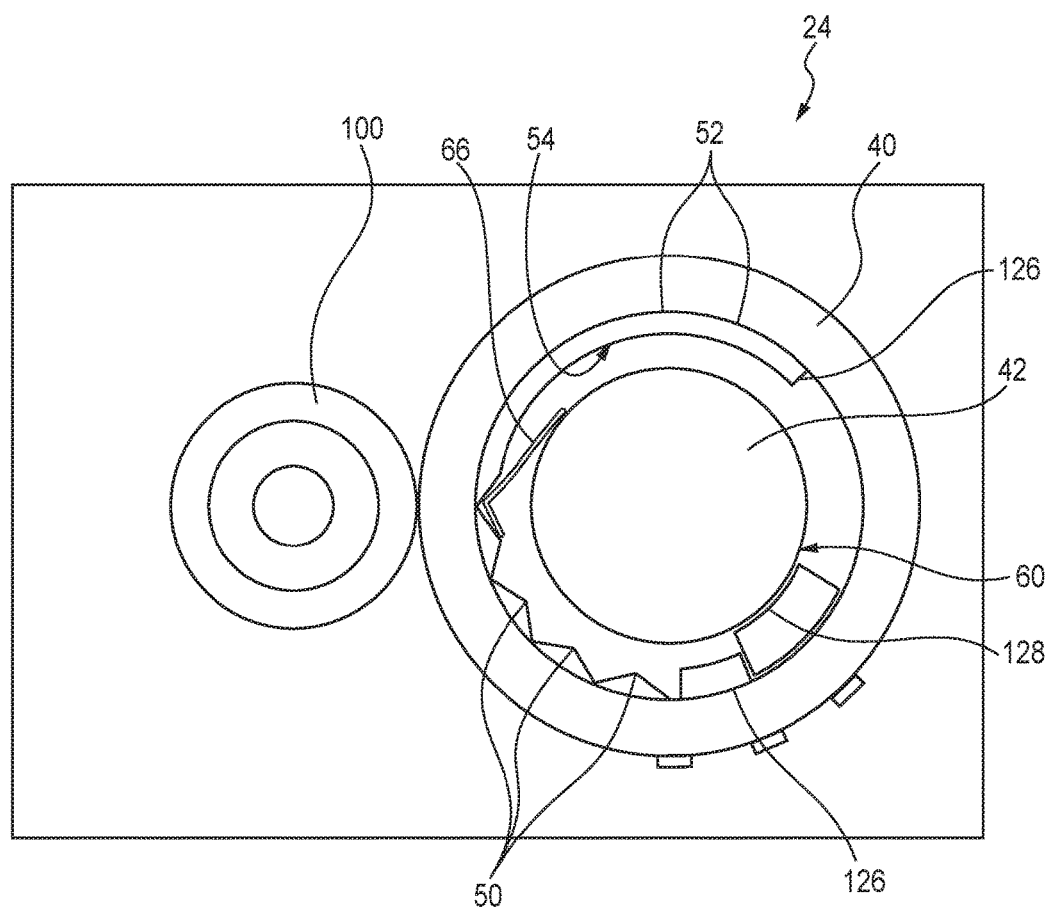
FIG. 7 is top view of cross-section of still yet another embodiment of the dial shifter of FIG. 3.

In yet a further alternate embodiment, illustrated in FIG. 7 the detent action is provided by a plurality of alternating peaks 50 and detents 52 disposed on an inner circumferential surface 54 of the shifter knob 40 and a cantilever spring 66 biased outwardly from an outer circumferential surface 62 of the rotation mechanism 42. The cantilever spring 66 engages the plurality of alternating peaks 50 and detents 52 of the shifter knob 40. When the operator of the vehicle 10 is finished rotating the shifter knob 40, the bias of the cantilever spring 66 will force the cantilever spring 66 to come to rest in one of the detents 52.

Any other detent mechanisms known to those skilled in the art may be applied to enable the operator of the vehicle 10 to sense rotation of the shifter knob 40 by tactile sensation. One such detent action can be achieved by using the detent mechanism as the one disclosed in U.S. Pat. No. 7,971,498. Besides the mechanical detent mechanisms described herein, the detent mechanisms may also include magnetorheological fluid detents alternatively engaged and disengaged by the application of a localized electromagnetic field, haptic feedback mechanisms known to those skilled in the art, and electrically controlled brakes to electrically provide detents and limit rotation of the knob in methods known to those skilled in the art.

As shown in FIGS. 2 and 3, a display panel 72 is provided in a part of the instrument panel 36 surrounding the dial shifter 24, and includes markings for the shift positions, such as P, R, N, D and S. The display panel 72 is provided with an internal lighting arrangement such that any selected one of the shift positions is illuminated. The arrangement of the shift positions is not limited by the illustrated embodiment, but may be selected as desired without departing from the spirit of the present disclosure. For instance, these shift positions may be arranged in either a clockwise or a counterclockwise direction. An L position or a 2 position may be provided in succession to the S position or instead of the S position. The B position may also be provided instead of the S position.

As discussed, a sensor 44 is used to detect rotation of the shift knob 40 about the rotation mechanism 42. In one embodiment, illustrated in the FIG. 4, the sensor 44 may be a Hall effect sensor 80, which creates current pulses in response to magnets 82 in the shift knob 40 passing the Hall effect sensor 80 during rotation of the shift knob 40.

In another embodiment, as illustrated in FIG. 5, the sensor 44 may be a potentiometer 90 integrated with the rotation mechanism 42 which provides a signal to the CPU 22 to identify rotation of the shifter knob 40.

In yet another embodiment, illustrated in FIG. 6, the sensor 44 may be a contact switch 100 that provides a signal to the CPU 22 indicating rotation of the shifter knob 40 based upon indentations 102 in the shifter knob 40 contacting the contact switch 40.

Finally, in a still further embodiment, as illustrated in FIG. 7, a rotary encoder 110 is provided on the back side of the instrument panel 36, and is configured to detect the angular displacement of the rotation mechanism 42. The detection signal of the rotary encoder 110 is forwarded to the CPU 22, and is used by the control unit 20 of the transmission 18. Any other method of detecting rotation of the dial shifter 24 known to those skilled in the art may also be employed.

Figure 8:
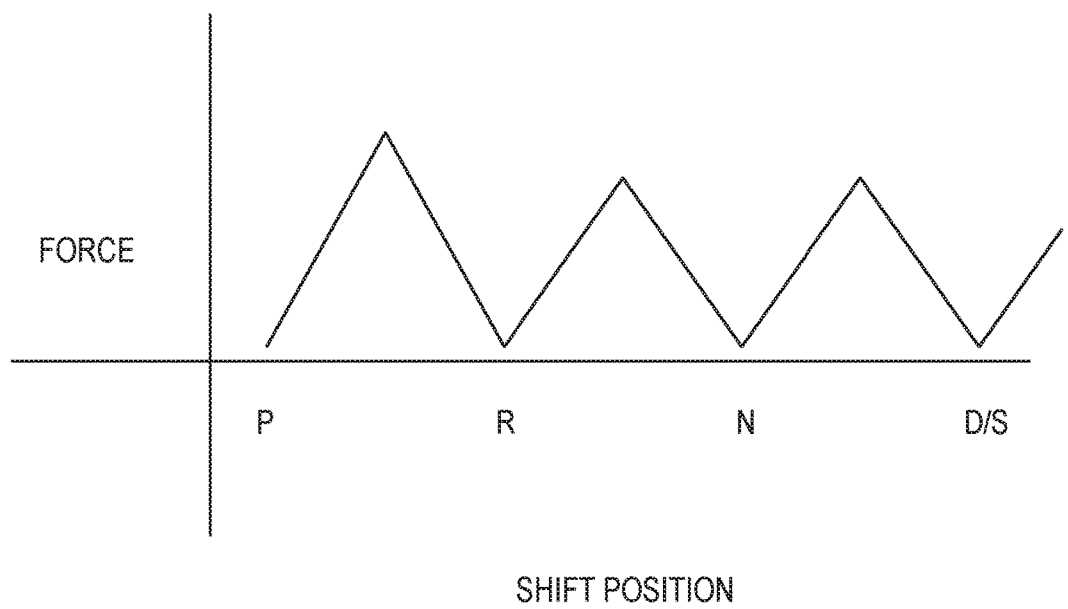
FIG. 8 is an illustration of a graph showing operation of the dial shifter of FIG. 3.

As shown in FIG. 1, the control unit 20 includes a shift position selecting unit 120 and a gear ratio selecting unit 122. The shift position selecting unit 120 changes the current shift position to a new shift position depending on the signal sent by the CPU 22 to the control unit 20 based on the operator of the vehicle 10 rotating the shift knob 40 of the dial shifter 24. Each time the sensor 44 registers a clockwise rotation of the shifter knob 40 by a prescribed angle (approximately 20 degrees in the illustrated embodiment), which is illustrated in FIG. 8, the control unit 20 changes the shift position by one stage. For instance, if the current shift position is the P position, and the dial shifter 24 is turned clockwise direction by 40 degrees, the control unit 20 changes the shift position by two stages, and sets the shift position to the N position. When turning the dial shifter 24, the dial shifter 24 may slightly overshoot the intended shift position when attempting to select the D position. In that case, the gear selection is returned back to the D position. The detent mechanism of the dial shifter 24 then finally settles the shift position at D. In such a case, it can be said that the dial shifter 24 was turned from the initial position to the D position. At any event, the angular displacement of any shift operation is determined as that between the initial angular position and the final angular position as a result of a single shifting operation.

When an angular displacement of 60 degrees or more is made without a pause, the D position is still selected. "Without a pause" in this case may mean that the dial shifter 24 was turned by a certain angle without being held stationary for more than a prescribed time period, such as 300 milliseconds (ms). Turning of the dial shifter 24 without a pause can be regarded as a single shifting operation. If there is a pause of more than 300 ms, the process of turning the dial shifter 24 is considered as being completed, and any subsequent rotation of the dial shifter 24 is considered as a second shifting operation which is separated from the first shifting operation by the pause. For instance, if the dial shifter 24 is turned in one direction and then in the opposite direction without a pause of more than 300 ms during the whole process, it is no different from turning the dial shifter 24 directly from the initial position to the final position without reversing the direction of dial shifter 24.

In order to select the S position, the vehicle operator must first select the D position, and the dial shifter must remain in the D position for a specified period of time, such as at least 300 ms. Upon the selection of the D position, the S position may be selected by then rotating the shift knob in a clockwise direction. The delay in selecting the S position prevents the operator of the vehicle 10 from accidentally or inadvertently selecting the S position when most operators will use the D position.

The shift device is configured such that the P position is selected at the start up of the vehicle 10. Therefore, if the engine 12 is disengaged prior to moving the shift back to the P position, the shift mechanism resets to the P position for the next time the vehicle 10 is started.

While the shifting has been described in a clockwise direction for moving from P to D/S, and counterclockwise to move from D/S to P, the shifting mechanism may be embodied such that the dial shifter 24 is rotated in a counterclockwise direction for moving from P to D/S, and clockwise direction to move from D/S to P.

In another embodiment, illustrated in FIG. 7, a first fixed stop 126 extends radially outward from the outer circumferential surface 60 of the rotation mechanism 42, and a second fixed stop 128 extends radially inward from the inner circumferential surface 54 of the shifter knob 40. When the two fixed stops 126, 128 come together, rotation in the direction of contact is stopped to prevent continuous rotation of the dial shifter 24. Any other method of limiting rotation of the dial shifter 24 known to those skilled in the art, such as by mechanical, electrical, or magnetic methods, may also be applied.

In one embodiment, the S position places the transmission 18 into a sport mode which transfers control of the transmission 18 to a pair of paddle shifters 132 located adjacent the steering wheel 130 of the vehicle 10.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A shifter mechanism for a transmission of a motor vehicle controlled by a transmission controller, comprising:
a central processing unit for transmitting a shifting request to the transmission controller;
a dial shifter, comprising:
a rotatable shifter knob; and
a rotation mechanism in communication with the rotatable shifter knob and about which the rotatable shifter knob rotates;
a sensor connected to the central processing unit for detecting rotation of the rotatable shifter knob;
wherein the central processing unit is configured to cause a selected shift position to be changed in the prescribed order in correspondence to a rotational displacement of the dial shifter in each single shifting operation under normal conditions, and to limit the selected shift position to be changed beyond a prescribed shift position depending on an initial shift position and an amount of the rotational movement of the dial shifter in a first shifting operation, and wherein the shift positions include a non-forward travel position, a D (drive) position for a normal forward travel and an additional forward travel position S for a special purpose arranged in that order in the first direction, and the central processing unit is configured to limit the change in the shift position from the non-forward travel position in the first shifting operation in the first direction to the D (drive) position without regard to the rotational displacement of the dial shifter beyond the D (drive) position; and
wherein the central processing unit is further configured to accept a change in the shift position from the D (drive) position to the forward travel position S in a second shifting operation in the first direction after an elapse of a specified amount of time from the first shifting operation.

2. The shifter mechanism of claim 1 further comprising:
a plurality of alternating peaks and detents disposed on an inner circumferential surface of the rotatable shifter knob; and
a plunger disposed within the rotation mechanism for engaging the inner circumferential surface of the rotatable shifter knob; and
a spring in communication with the plunger for biasing the plunger in a radially outward direction and into contact with the inner circumferential surface of the rotatable shifter knob.

3. The shifter mechanism of claim 1 further comprising:
a plurality of alternating peaks and detents disposed on an outer circumferential surface of the rotation mechanism;
a plunger disposed within an inner circumferential surface of the rotatable shifter knob for engaging the outer circumferential surface of the rotation mechanism; and
a spring in communication with the plunger for biasing the plunger in a radially inward direction and into contact with the outer circumferential surface of the rotation mechanism.

4. The shifter mechanism of claim 1 further comprising:
a plurality of alternating peaks and detents disposed on an outer circumferential surface of the rotation mechanism; and
a cantilever spring biased inwardly from an inner circumferential surface of the rotatable shifter knob, the cantilever spring engaging the plurality of alternating peaks and detents of the rotation mechanism.

5. The shifter mechanism of claim 1 further comprising:
a plurality of alternating peaks and detents disposed on an inner circumferential surface of the rotatable shifter knob; and
a cantilever spring biased outwardly from an outer circumferential surface of the rotation mechanism, the cantilever spring engaging the plurality of alternating peaks and detents of the rotatable shifter knob.

6. The shifter mechanism of claim 1 wherein the sensor further comprises:
a Hall effect sensor disposed in the rotation mechanism for detecting a magnetic field; and
a magnet disposed in the rotatable shifter knob, the Hall effect sensor detecting the magnet each time the magnet rotates about the Hall effect sensor.

7. The shifter mechanism of claim 1 wherein the sensor further comprises:
a contact switch.

8. The shifter mechanism of claim 1 wherein the sensor further comprises:
a potentiometer.

9. The shifter mechanism of claim 1 wherein the rotatable shifter knob is cylindrical in shape.

10. The shifter mechanism of claim 9 wherein the rotatable shifter knob has a diameter of 50-55 mm.

11. A shifter mechanism for a transmission of a motor vehicle, the transmission controlled by a transmission controller, comprising:
a dial shifter that can be manually advanced selectively in a first direction and a second direction;
a sensor that detects a movement of the dial shifter;
a central processing unit for instructing the transmission controller to select a shift position of the transmission from a plurality of shift positions in a prescribed order according to a detection signal of the sensor, wherein the central processing unit is configured to cause the selected shift position to be changed in the prescribed order in correspondence to a rotational displacement of the dial shifter in each single shifting operation under normal condition, and to limit the selected shift position to be changed beyond a prescribed shift position depending on an initial shift position and an amount of the rotational movement of the dial shifter in a single shifting operation, and wherein the shift positions include a non-forward travel position, a D (drive) position for a normal forward travel and an additional forward travel position S for a special purpose arranged in that order in the first direction, and the central processing unit is configured to limit the change in the shift position from the non-forward travel position in a single shifting operation in the first direction to the D (drive) position without regard to the rotational displacement of the dial shifter beyond the D (drive) position; and wherein the central processing unit is further configured to accept a change in the shift position from the D (drive) position to the forward travel position S in a second shifting operation in the first direction after an elapse of a specified amount of time.

12. The shifter mechanism of claim 11 wherein dial shifter may be rotated in either direction.

13. The shifter mechanism of claim 12 wherein the dial shifter further comprises a detent mechanism that retains the dial shifter resiliently at each of the shift positions.

14. The shifter mechanism of claim 11 wherein the non-forward travel position comprises at least one of a P (park) position, a R (reverse) position and a N (neutral) position.

15. The shifter mechanism of claim 14 wherein the transmission may be shifted from the D (drive) position to the additional forward travel position S in a second shifting operation in the first direction after the selection of the D (drive) position is completed in a first shifting operation without regard to the rotational displacement of the dial shifter beyond the D (drive) position.

16. The shifter mechanism of claim 11 further comprising:
an indicator that indicates the selected shift position.

17. A shifter mechanism for a transmission of a motor vehicle, the transmission controlled by a transmission controller, comprising:
a dial shifter that can be manually advanced selectively in a first direction and a second direction, the dial shifter comprising:
a rotatable shifter knob; and
a rotation mechanism in communication with the rotatable shifter knob and about which the rotatable shifter knob rotates;

a sensor that detects a movement of the dial shifter;
a central processing unit for instructing the transmission controller to select a shift position of the transmission from a plurality of shift positions in a prescribed order according to a detection signal of the sensor;

wherein the central processing unit is configured to cause the selected shift position to be changed in the prescribed order in correspondence to a rotational displacement of the dial shifter in each single shifting operation under normal condition, and to limit the selected shift position to be changed beyond a prescribed shift position depending on an initial shift position and an amount of the rotational movement of the dial shifter in a single shifting operation;

wherein the shift positions include a non-forward travel position, a D (drive) position for a normal forward travel and an sport mode forward travel position S arranged in that order in the first direction;

wherein the central processing unit is configured to limit the change in the shift position from the non-forward travel position in a single shifting operation in the first direction to the D (drive) position without regard to the rotational displacement of the dial shifter beyond the D (drive) position; and wherein the transmission may be shifted from the D (drive) position to the sport mode forward travel position S in a second shifting operation in the first direction after the selection of the D (drive) position is completed in a first shifting operation, defined by an elapse of a specified amount of time, without regard to the rotational displacement of the dial shifter beyond the D (drive) position.

18. The shifter mechanism of claim 17 wherein the dial shifter further comprises a detent mechanism that retains the dial shifter resiliently at each of the shift positions.

19. The shifter mechanism of claim 18 wherein the non-forward travel position comprises at least one of a P (park) position, a R (reverse) position and a N (neutral) position.

20. The shifter mechanism of claim 19 further comprising:
an indicator that indicates the selected shift position.

* * * * *